March 17, 1970 R. L. DEGA ET AL 3,501,155
BI-DIRECTIONAL SEAL
Filed May 22, 1967

INVENTORS
Robert L. Dega &
Louis H. Weinand
E. J. Biskup
ATTORNEY

United States Patent Office 3,501,155
Patented Mar. 17, 1970

3,501,155
BI-DIRECTIONAL SEAL
Robert L. Dega, Mount Clemens, and Louis H. Weinand, Warren, Mich., assignors to General Motors Corporation, Detroit, Mich., a corporation of Delaware
Filed May 22, 1967, Ser. No. 639,972
Int. Cl. F16j 15/32, 15/54
U.S. Cl. 277—1                                6 Claims

ABSTRACT OF THE DISCLOSURE

A fluid seal for sealing the space between two relatively rotating members characterized by having ribs transversely inclined to the axis of rotation formed on conical walls adjacent a static seal lip. The ribs are adapted to develop a positive pumping force opposing fluid leakage regardless of the direction of relative rotation.

In the past, fluid sealing devices have used the technique of balancing leakage flow forces with hydrodynamic forces to minimize fluid leakage. While many configurations have been formed on both the shaft and on the seal to generate these hydrodynamic forces, their primary use has been restricted to unidirectional shaft applications inasmuch as reverse rotation of the members produces a pumping force cumulative to that of leakage thereby making their use on transmission, differentials, and other similar bi-directional shaft applications, unacceptable.

A seal, made in accordance with the present invention, overcomes these difficulties by having helically disposed ribs formed on the opposed conical walls which define a static seal lip. The ribs are arranged so when the members are relatively rotated in one direction, hydrodynamic forces are generated which cause the fluid to move towards the seal lip. This is realized by having the ribs on the wall facing the atmosphere designed to provide a hydrodynamic force greater than the combined forces of the ribs on the wall facing the fluid to be sealed and the leakage forces caused by pressure within the fluid chamber. As a result, any fluid leaking past the seal lip is returned to the fluid side of the seal lip by the increased fluid pumping capabilities of the ribs on the atmospheric side of the seal. When relative rotation of the members is reversed, the ribs on the walls are effective to develop hydrodynamic forces which direct fluid away from the seal lip to thereby preclude leakage.

Accordingly, the objects of this invention are; to provide a seal for sealing the space between two relatively rotating members wherein hydrodynamic means prevent fluid leakage regardless of the direction of relative rotation of the members; to utilize the pumping capabilities of hydrodynamic ribs to provide effective bi-directional sealing; and to provide a fluid seal wherein fluid leakage forces are balanced by the pumping forces developed by helical ribs formed on the walls adjacent a static seal lip.

These and other objects and advantages will become apparent to one skilled in the art upon reading the following detailed description, reference being made to the accompanying drawings in which.

Figure 1:
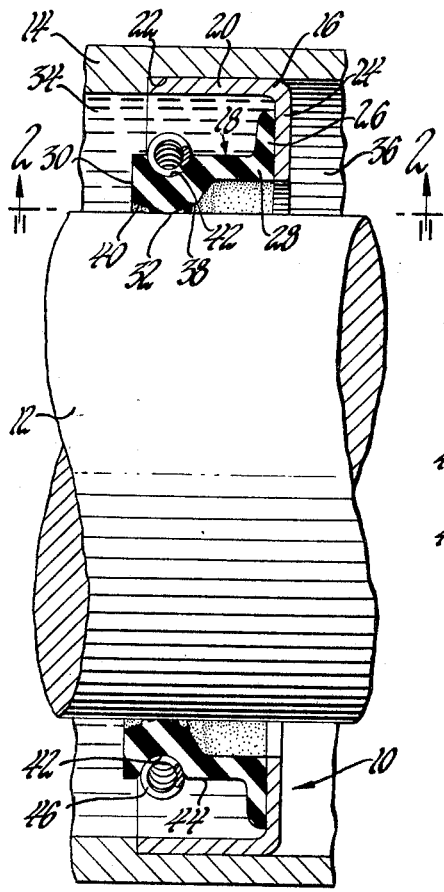
FIGURE 1 is a longitudinal cross sectional view of a fluid seal made in accordance with the present invention.

Referring to the drawings, the fluid seal 10, made in accordance with the present invention, is designed to seal the space between a rotatable shaft 12 and a stationary housing 14 and, in general, comprises a metallic casing 16 and a sealing annulus 18 formed of an elastomeric material, such as rubber, and having characteristics of resiliency and durability suitable for the desired application.

The casing 16 is generally L-shaped in cross-section and comprises an axially extending outer arm 20 adapted to be sealingly fitted against the shouldered bore 22 of the housing 14 and a radially inwardly extending arm 24 to which the butt end 26 of the sealing annulus 18 is rigidly attached by any suitable means such as bonding. The sealing annulus 18 includes a flex section 28 and a seal body 30 and, in an unflexed condition, extends axially in a parallel relationship to the outer arm 20. A radially inwardly extending seal lip 32, formed on the inner circumferential portion of the seal body 30, sealingly engages the shaft 12 and, under static conditions, prevents the passage of fluid from a fluid chamber 34 to the air chamber 36. The diameter of the seal lip 32 is selected to be somewhat smaller than the shaft diameter so that the interference established with the shaft surface is sufficient to maintain an effective static seal about the full circumference of the seal lip regardless of shaft eccentricity or misalignment.

Figure 6:
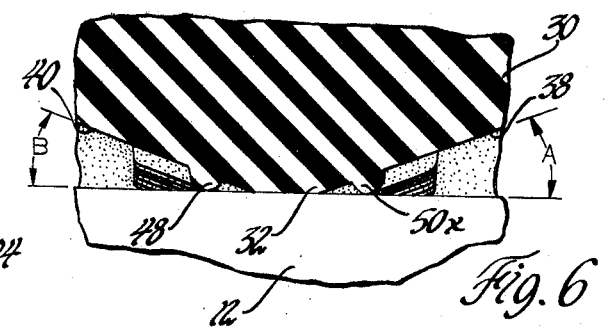
FIGURE 6 is an enlarged cross sectional view of the seal lip shown in FIGURE 1.

Axially diverging conical walls 38 and 40 extend outwardly from the edges of the seal lip 32 and as shown in FIGURE 6, the air side wall 38 has an approach angle A and the fluid side wall 40 has a toe angle B with respect to the axis of the shaft 12. A circumferential groove 42, formed in the outer periphery 44 of the flex section 28, accommodates a garter spring 46 that is tensioned to apply radial inward force sufficient to urge the seal lip 32 into sealing engagement with the shaft surface when the shaft is not rotating.

Figure 2:
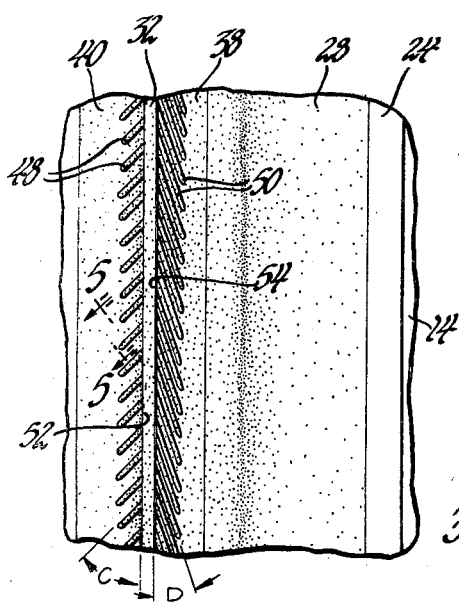
FIGURE 2 is an enlarged developed view taken along line 2—2 of FIGURE 1.

As seen in FIGURE 2, a plurality of ribs 48 are molded or otherwise formed on the fluid side wall 40 while similar ribs 50 are formed on the air side wall 38. The ribs 48 and 50 are molded to have an angle C and D, respectively, with respect to seal lip 32 and, for discussion purposes, these angles will be referred to as helix angles. These may be of the type shown and described in the co-pending application of Weinand, S.N. 582,368, filed on Sept. 27, 1966 and assigned to the assignee of the present invention and as shown form a general herringbone pattern. In the assembled position of FIGURE 1, each rib partially contacts the shaft along a portion of its length. The amount of actual contact will be, in part, dependent on the interference, the tension and location of the spring 46, and the rib shapes. If viewed axially, it will be seen each rib is transversely inclined in the same direction with respect to the shaft axis. It should also be noted that due to purely geometric considerations, the sealing helix angle will be greater than the molded helix angle. These ribs create hydrodynamic pumping forces and, as will be explained more fully below, by varying the number of ribs, the helix angle, the size and length of the ribs, the hydrodynamic pumping characteristics of each set of ribs, can be controlled to give optimum performance for a given seal application.

For proper application of the hydrodynamic sealing principle, a fluid film should be established between the seal lip 32 and the shaft 12 during dynamic operation. The hydrodynamic pressure developed by fluid side ribs 48 will combine with the leakage forces generated by the pressure in the fluid chamber to lift the seal lip 32 off the sealing surface and establish the desired fluid film when the shaft is rotated. Once a continuous fluid film has been established, movement of the film past the seal lip will be opposed by the hydrodynamic forces developed by the air side ribs 50.

The establishment of the above-mentioned film is aided by locating the axis of the spring 46 slightly away from the lip edge 52 toward the atmospheric side so that the pressure across the width of the seal lip 32 is at a minimum at the fluid side edge 52 and a maximum at the air side edge 54. This condition allows the fluid film to develop progressively across the seal lip 32 as the shaft 12 is rotated. In this connection, it should be noted that a slight inclination of the seal lip 32 toward the fluid chamber 34 is permissible as long as the circumferential static seal can be attained. However, the spring 46 should not be located such that excessive pressure is applied to the oil side edge 52 inasmuch as this condition would allow the seal lip 32 to run dry thereby increasing the possibility of wear. Also, the seal lip 32 should not be inclined to the extent that either the fluid side ribs 48 or the air side ribs 50 are lifted from contact with the shaft surface inasmuch as this condition would decrease their pressure-producing capabilities.

In operation, when the shaft 12 is rotating counter-clockwise as viewed from the right end, the ribs 48 and 50 will act as hydrodynamic pumps and develop a positive pumping force which directs the fluid towards the static seal lip 32. However, when the shaft is rotating clockwise, the pumping forces developed by ribs 48 and 50 will direct the fluid outwardly from the seal lip. It is desirable that the ribs develop the pumping force toward the seal lip in the direction of most prevalent rotation.

It should be apparent that in order to establish effective bidirectional sealing, a positive force must always oppose the leakage forces. Therefore, the pumping force developed by the air side ribs 50 must be greater than the combined forces of leakage and fluid side pumping when the shaft is rotating in the counter-clockwise direction. When the shaft is rotating oppositely, the oil side ribs 48 must develop a pumping force sufficient to oppose the leakage forces so that fluid will be prevented from reaching the air side ribs 50 thus making these ribs hydrodynamically inoperative. These pumping capabilities can be achieved by applying certain principles of hydrodynamic sealing; namely, as the number of ribs increases, the pressure producing capability increases; as the helix angle decreases, the pumping and pressure capabilities increase; as the rib height increases, the sealing efficiency decreases; and as the length of ribs in contact with the shaft surfaces increases by increasing the approach and/or toe angles, the sealing efficiency increases. While there are other considerations, these are the major ones affecting hydrodynamic sealing performance.

In accordance with the above criteria, an effective bi-directional seal can be made by utilizing the following: a 45° helix angle and a 20° toe angle for the oil side ribs; a 20° helix angle and a 15° approach angle for the air side ribs; a .010 inch static seal lip width; a width and height of .003 inch for the ribs; twice the number of ribs; a 20° helix angle and a 15° approach angle for the spring to apply a 50 p.s.i. radially inward loading across the width of the seal lip; locating the axis of the garter spring .015 inch beyond the air side seal lip edge; and using an interference of .050 inch.

Figure 3:
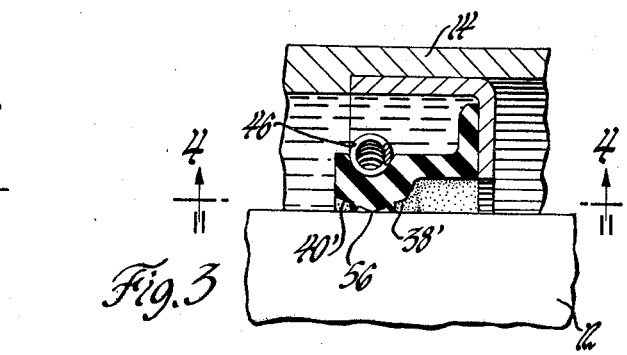
FIGURE 3 is a modification of the seal shown in FIGURE 1.
Figure 4:
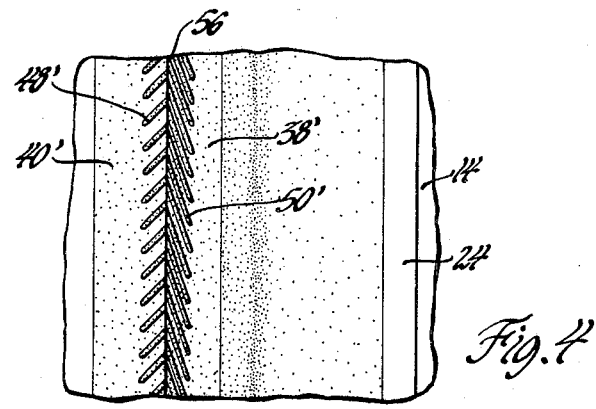
FIGURE 4 is an enlarged developed view taken along line 4—4 in FIGURE 3.
Figure 5:
FIGURE 5 is an enlarged cross sectional view taken along line 5—5 of FIGURE 2.

A modification of the invention, shown in FIGURES 3 and 4, eliminates the static seal lip between the intersecting walls 38' and 40'. In this design, the seal ribs 48' and 50' are staggered to provide a discontinuous fluid path. Unless the rib height is under .003 inch and the spring 46 located near the apex 56, the ribs may not be sufficiently compressed to prevent static leakage, making this embodiment, though satisfactory with proper seal parameters, less flexible in design than the one using a static seal lip.

Since certain obvious changes and modifications will become apparent to one skilled in the art, the scope of the invention, as defined by the appended claims, it is intended to cover such alterations of the described embodiments,

What is claimed is:

1. A fluid seal for sealing between a relatively rotating shaft member and a housing member comprising a casing supported by the housing member, a sealing annulus connected to the casing and including a radially inwardly extending seal lip circumferentially engaging the shaft member and establishing a barrier to the leakage of fluid between a fluid chamber and an air chamber, a groove formed in the outer periphery of the sealing annulus and a garter spring located in the groove, the groove and the garter spring located in a plane parallel to the seal lip and spaced toward the air chamber a sufficient distance so as to apply sufficient force to establish a static seal between the seal lip and the shaft member when the members are at rest while allowing a lubricant film caused by leakage forces to be maintained between the seal lip and the shaft member when the members are relatively rotating, axially diverging conical walls formed on either side of the seal lip, a plurality of first ribs formed on the wall facing the air chamber, a plurality of second ribs formed on the wall facing the fluid chamber, each of the ribs partially contacting the shaft member and transversely inclined in the same direction with respect to the axis of rotation of the shaft member, each of said first and second ribs adapted to develop a hydrodynamic force directed toward the seal lip when the members are relatively rotated in one direction, said first ribs developing hydrodynamic force greater than the combined forces of leakage and the hydrodynamic force developed by the second ribs, and said second ribs adapted to develop a hydrodynamic force directed away from the seal lip when the members are oppositely relatively rotated that is greater than the leakage forces whereby sealing between the members will be maintained regardless of the direction of relative rotation.

2. A method of hydrodynamically sealing the space between two members irrespective of the direction of relative rotation and under conditions where one side of the members is exposed to a chamber filled with liquid and the other side of the members is exposed to the atmosphere, comprising the steps of generating first and second pumping actions operating in opposed directions by rotating one of said members in a given direction corresponding to the direction of most prevalent relative rotation between said members, maintaining the first pumping action at a force value greater than the combined forces acting on the liquid established by the pressure in the chamber and by the second pumping action when said one of said members is rotating in said given direction, and causing said second pumping action to oppose leakage while the first pumping action is substantially inoperative when said one of said members is rotating in a direction opposite to said given direction, and biasing a flexible portion of the other of said members into sealing engagement with said one of said members between said first and second pumping actions when said members are not relatively rotating.

3. A hydrodynamic seal for sealing the space between a housing and a bi-directionally rotatable shaft having a direction of most prevalent rotation and thereby preventing the passage of fluid from a fluid chamber to an air chamber, said hydrodynamic seal comprising: an annular casing mountable on the housing; an elastomeric sealing annulus attached at one end to said casing and having an enlarged seal body at the other end that has a radially inwardly facing seal lip engageable with the shaft; axially diverging conical walls formed on said seal body and extending outwardly from the edges of said seal lip wherein one of said walls faces the fluid chamber and the other of said walls faces the air chamber; a spring retained on said seal body for radially inwardly biasing said seal lip into engagement with sufficient force so as to establish a static seal with the shaft when the latter is at rest while allowing a lubricant film caused by leakage forces to be maintained between said seal lip and the shaft when the latter is rotating; a plurality of ribs formed on each of said walls that are transversely inclined in said direction of most prevalent rotation, each of said ribs partially contacting the shaft and being effective to develop a hydrodynamic force directed toward said seal lip when the shaft is rotated in said direction of most prevalent rotation wherein the arrangement is such that said ribs on the wall facing the air chamber develop a hydrodynamic force greater than the combined force of the leakage forces and the hydrodynamic forces developed by the ribs on said wall facing the fluid chamber, the latter mentioned ribs developing a hydrodynamic force directed away from said seal lip upon reversal of shaft rotation that is greater than the leakage forces whereby sealing between the housing and the shaft will be maintained regardless of the direction of shaft rotation.

4. The hydrodynamic seal as recited in claim 3 wherein the ribs on the wall facing the air chamber have a relatively low helix angle with respect to the seal lip of about 20° for producing high pumping and pressure capabilities to develop said hydrodynamic force greater than the combined force of the leakage forces and the hydrodynamic forces developed by the ribs on the wall facing the fluid chamber.

5. The hydrodynamic seal is recited in claim 4 wherein the ribs on the wall facing the fluid chamber have a relatively high helix angle with respect to the seal lip of about 45° for producing lesser pumping and pressure capabilities than said ribs on the wall facing the air chamber but developing a hydrodynamic force greater than said leakage forces.

6. The hydrodynamic seal as recited in claim 5 wherein the number of ribs on the wall facing the air chamber is about twice the number of ribs on the wall facing the fluid chamber.

References Cited

UNITED STATES PATENTS

| 2,188,857 | 1/1940 | Chievitz | 277—134 |
| 2,446,380 | 8/1948 | Meyers et al. | 277—134 X |

FOREIGN PATENTS

| 1,101,074 | 3/1961 | Germany. |
| 1,153,578 | 8/1963 | Germany. |
| 1,469,429 | 1/1967 | France. |

SAMUEL ROTHBERG, Primary Examiner

U.S. Cl. X.R.

277—134

PO-1050
(5/69)

UNITED STATES PATENT OFFICE
CERTIFICATE OF CORRECTION

Patent No. 3,501,155      Dated March 17, 1970

Inventor(s) Robert L. Dega and Louis H. Weinand

It is certified that error appears in the above-identified patent and that said Letters Patent are hereby corrected as shown below:

Column 3, line 56, after "ribs" delete "; 20° helix angle and a 15° approach angle for the" and insert in its place -- on the air side as on the oil side; tensioning the garter --.

SIGNED AND SEALED
JUL 14 1970

(SEAL)
Attest:

Edward M. Fletcher, Jr.
Attesting Officer

WILLIAM E. SCHUYLER, JR.
Commissioner of Patents